(12) United States Patent
DeCosta

(10) Patent No.: US 10,914,403 B2
(45) Date of Patent: Feb. 9, 2021

(54) ADJUSTABLE MOUNTING APPARATUS

(71) Applicant: Thomas DeCosta, Westport, MA (US)

(72) Inventor: Thomas DeCosta, Westport, MA (US)

(*) Notice: Subject to any disclaimer, the term of this patent is extended or adjusted under 35 U.S.C. 154(b) by 0 days.

(21) Appl. No.: 16/412,568

(22) Filed: May 15, 2019

(65) Prior Publication Data
US 2019/0360612 A1    Nov. 28, 2019

Related U.S. Application Data

(60) Provisional application No. 62/672,497, filed on May 16, 2018.

(51) Int. Cl.
| | | |
|---|---|---|
| *F16L 3/015* | (2006.01) | |
| *F16M 13/02* | (2006.01) | |
| *H01B 7/40* | (2006.01) | |
| *H04R 1/02* | (2006.01) | |
| *H02G 3/22* | (2006.01) | |

(52) U.S. Cl.
CPC .......... *F16L 3/015* (2013.01); *F16M 13/022* (2013.01); *F16M 2200/06* (2013.01); *H01B 7/40* (2013.01); *H02G 3/22* (2013.01); *H04R 1/026* (2013.01); *H04R 2201/025* (2013.01)

(58) Field of Classification Search
CPC ... F16L 3/015; F16M 13/022; F16M 2200/06; H01B 7/40; H02G 3/22; H04R 1/026; H04R 2201/025
See application file for complete search history.

(56) References Cited

U.S. PATENT DOCUMENTS

| 4,134,636 | A  | * | 1/1979  | Kleinatland | ........... | H02G 3/123 |
|---|---|---|---|---|---|---|
| | | | | | | 174/58 |
| 4,479,317 | A  | * | 10/1984 | Hanna | ...................... | H01H 9/18 |
| | | | | | | 174/66 |
| 6,746,191 | B2 | * | 6/2004  | Edland | .................. | F16B 13/061 |
| | | | | | | 411/34 |
| 7,759,576 | B1 | * | 7/2010  | Gretz | ..................... | H02G 3/123 |
| | | | | | | 174/58 |
| 8,148,634 | B1 | * | 4/2012  | Gretz | ..................... | H02G 3/123 |
| | | | | | | 174/50 |
| 8,357,853 | B1 | * | 1/2013  | Gretz | ....................... | H02G 3/14 |
| | | | | | | 174/480 |
| 8,445,779 | B1 | * | 5/2013  | Gretz | ..................... | H02G 3/123 |
| | | | | | | 174/53 |

(Continued)

*Primary Examiner* — Anita M King

(57) ABSTRACT

An adjustable mounting apparatus is disclosed for securing devices to a wall, such as speakers and the like, and includes a cable pass through for routing associated device cables through the wall. The adjustable mounting apparatus includes a rigid frame with a lip having an opening therein, a rearward extending sidewall surrounding the opening, and rearwardly extending guide members extending rearward from said sidewalls and terminating at their ends into a cross-member. To secure the rigid frame to a wall the guide members including attached clamp arms are passed through a hole in the wall and the clamp arms are rotated to draw the clamp arms toward the rear surface of the wall while thereby forcing the front lip of the mounting apparatus against the front surface of the wall to secure it thereon. A rigid mounting plate is snap fit into the opening and includes a load arm adjustable within the mounting plate for angular adjustability of an attached device.

20 Claims, 26 Drawing Sheets

(56) References Cited

U.S. PATENT DOCUMENTS

| | | | | |
|---|---|---|---|---|
| D719,520 S | * | 12/2014 | DeCosta | D13/155 |
| D719,522 S | * | 12/2014 | DeCosta | D13/155 |
| 9,611,879 B2 | * | 4/2017 | DeCosta | F16B 13/0833 |
| D866,482 S | * | 11/2019 | DeCosta | D13/155 |
| 10,781,967 B1 | * | 9/2020 | DeCosta | F16M 13/02 |
| 2003/0209358 A1 | * | 11/2003 | Kruse | H02G 3/18 |
| | | | | 174/58 |
| 2012/0291220 A1 | * | 11/2012 | Okuhara | H02G 3/22 |
| | | | | 16/2.2 |
| 2014/0341673 A1 | * | 11/2014 | DeCosta | F16B 13/0808 |
| | | | | 411/80.1 |
| 2017/0356480 A1 | * | 12/2017 | DeCosta | H02G 3/00 |

* cited by examiner

ADJUSTABLE MOUNTING APPARATUS

CROSS-REFERENCE TO RELATED APPLICATIONS

The present application is related to, claims the earliest available effective filing date(s) from (e.g., claims earliest available priority dates for other than provisional patent applications; claims benefits under 35 USC § 119(e) for provisional patent applications), and incorporates by reference in its entirety all subject matter of the following listed application(s) (the "Related Applications") to the extent such subject matter is not inconsistent herewith; the present application also claims the earliest available effective filing date(s) from, and also incorporates by reference in its entirety all subject matter of any and all parent grandparent, great-grandparent, etc. applications of the Related Application(s) to the extent such subject matter is not inconsistent herewith:

U.S. non-provisional patent application Ser. No. 15/613,228 entitled "Rapid Mount Wall Anchoring System Incorporating a Power Feed Through Connector Assembly", naming Thomas DeCosta as inventor, filed Jun. 4, 2017;

U.S. provisional patent application 62/672,497 entitled "Adjustable Mounting Apparatus", naming Thomas DeCosta as inventor, filed May 16, 2018.

FIELD OF USE

The invention generally relates to a rapid mount anchoring system that in one embodiment can be used for mounting electrical devices or speakers on walls and in buildings where angular adjustability is required.

BACKGROUND

Mounting apparatuses are known in the art, however, mounts for speakers and the like (Speakers, cameras, televisions) having the capability to 1.) support the weight of such mounted elements, 2) allow for angular adjustability of the attached device, and 3.) to provide an efficient connectorized power delivery system that includes mateable connectors and a direct interface to electrical devices would be desirable.

What is needed is a mount and assembly and a method of disengagement thereof that solves one or more of the problems described herein and/or one or more problems that may come to the attention of one skilled in the art upon becoming familiar with this specification.

Grommet assemblies for the routing of cables are known in the art. For example, U.S. Pat. No. 8,357,853 is a rapid mount electrical cable entry device with a flexible slotted insert for routing low voltage cables through walls. The cable entry device includes a rigid low voltage frame with a plate having an opening therein, a rearward extending sidewall surrounding the opening, and a flexible insert within the opening. The flexible insert is removable to provide access to mounting fasteners on the inner periphery of the plate opening. All that is required for preparing the wall for installation of the cable entry device is a simple circular hole, which can be rapidly made in the sheet rock by a simple hole saw.

However, the inventions heretofore known suffer from a number of disadvantages which include being difficult to use, being difficult to install, being unduly complex, being limited in application, being limited in use, being limited in adaptability especially to ranges of wall thickness, being expensive, being, expensive/difficult to manufacture, requiring too many parts, needing tools to install, being difficult to remove being difficult to install/uninstal, being slow to install, having an undesirable and/or non-standard exterior/interior appearance, failing to provide a consistent hold across a range of and/or varying wall thicknesses, failing to grip a sloppy bole well, having too large a profile, taking up too much space (e.g. during storage/transport), and having a mechanism, that will not work with different tab styles, and/or being too heavy.

A field installed rapid mount wall anchoring system incorporating a power feed through connector assembly, usable in horizontal ceilings and vertical walls, for the mounting of electrical devices or speakers on walls and in buildings where angular adjustability is required, is an improvement in the art and is disclosed below.

SUMMARY OF THE INVENTION

An adjustable mounting apparatus is disclosed for securing devices to a wall, such as speakers and the like, and includes a cable pass through for routing associated device cables through the wall. The adjustable mounting apparatus includes a rigid frame with a lip having an opening therein, a rearward extending sidewall surrounding the opening, rearwardly extending guide members extending rearward from said sidewalls and terminating at their ends into a cross-member, and a rigid mounting plate within the opening. The rigid mounting plate is snap fit into the opening and includes a center positioned threaded bore to secure the mounting plate to the mounting apparatus. The mounting plate further allows for angular adjustability of the attached device (speaker, camera, etc) to position it in the desired angular orientation.

The rigid mounting plate may further include a second opening for the mateable connection of a power delivery connector assembly. The connector assembly includes at one end a generally L shaped connector that is preferably overmolded, the connector includes gripping means to facilitate mounting of the connector to the mounting plate second opening. The connector includes an end lip with a width wide enough to ensure a tight fit that is still capable of slidable engagement into the mounting plate second opening.

The mounting plate includes a guide channel accessible through the front of the mounting plate that extends rearward terminating in close proximity to the cross-member. The guide channel, in the preferred embodiment, is integral to the mounting plate and includes a longitudinal bore in substantial alignment with the center positioned threaded bore of the mounting plate.

A load arm extends through the guide channel, the load arm having a first end that connects to an external load (ie. Speaker, camera, etc) positioned forward of the front of the mounting plate. The load arm first end includes means for hingedly connecting the load. The load would include a fixed mounting point adaptable to engage the first end of the load arm to provide horizontal angular adjustability about the hinge point.

The load arm second end is positioned rearward of the mounting plate, internal to the mounting apparatus and includes a semi-circular end having stepped grooves to engage the cross-member at varying angular positions. When the mounting plate is removed from its fixed position in the opening the load arm is adjustable within the guide channel for positioning the first end of the load arm at different angles. These different angles correspond to varying vertical positions of the attached load (ie speaker).

The load arm is adjustable about a pivot point positioned within the guide channel, the pivot point including means to retain the load arm midsection within the channel at a fixed position determined by the load arms second end engaged position with the cross-member.

All that is required for preparing a wall for installation of the mounting apparatus is a simple circular hole, which can be rapidly made in the sheet rock by a simple hole saw. To secure the rigid frame to the wall, the mounting fasteners with attached clamp arms and the guide members are passed through the hole in the wall and the clamp arms are rotated to draw the clamp arms toward the rear surface of the wall and thereby forcing the front lip of the mounting apparatus against the front surface of the wall to secure it thereon.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

In the following description, the same numerical references refer to similar elements. The embodiments, geometrical configurations, materials mentioned and/or dimensions shown in the figures or described in the present description are preferred embodiments only, given for exemplification purposes only.

Figure 1:
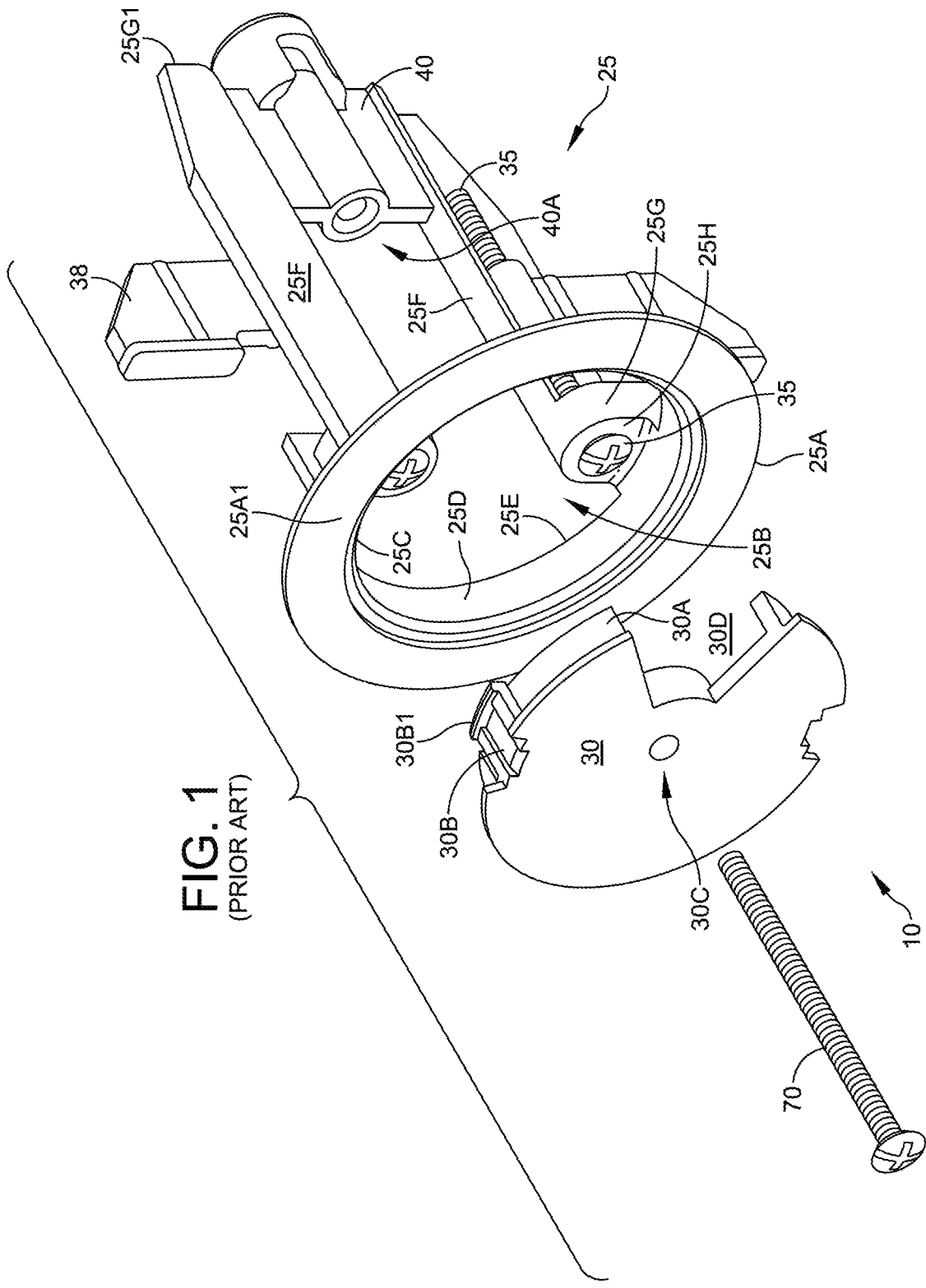
FIG. 1 illustrates a prior art embodiment of a rapid mount wall anchoring system including a unitary rigid plate 30 as a mounting platform.

In Referring to FIG. 1 there is shown the prior art embodiment of the present invention, U.S. Pat. No. 9,611,879 issued to Decosta on Apr. 4, 2017, disclosing a rapid mount wall anchoring system 10 with a rigid frame 25 and a load bearing plate insert 30.

In this embodiment, the rigid frame 25 can be installed without bearing plate insert 30, where plate insert 30 is separate and removable. In this embodiment the system 10 may be used for cable pass through only. The opening may also include any grommet type insert known in the art. One such insert is illustrated in U.S. Pat. No. D719,521, dtd Dec. 16, 2014 to DeCosta. The rigid frame 25 includes a lip 25A having an opening 25B therein and an inner periphery 25C on the lip 25A surrounding the opening. Extending rearward from inner periphery 25C is a sidewall 25D extending to an outer periphery 25E. As illustrated in FIG. 1, two guide members 25F aligned opposite each other, and integral with the plate 25, extend rearward from outer periphery 25E. The two guide members 25F include mounting bosses 25G include a face 25H including apertures therein (not shown).

The lip 25A includes a front surface 25A1 and the faces 25H of the mounting, bosses 25G are recessed away from the front surface 25A1 of the Lip 25A. Although two guide members are illustrated, a single guide member having a threaded bore arrangement in alignment with bore 30C could be utilized with reduced load bearing characteristics. Further, the guide member and mounting arrangement may be a single element or arranged separately without departing from the spirit and scope of the invention.

Substantially long threaded fasteners 35 extend through mounting bosses 25G apertures and engage clamp arms 38. Clamp arms 38 include a threaded bore for engagement of threaded fasteners 35 to rotate clamp arms 38 between an extended position and retracted position as desired. The clamp arms 38 may also be rotated inward so they are confined within the perimeter of lip 25A.

Guide members 25F are situated 180 degrees apart having at one end mounting bosses 25G and opposite ends 25G1 connected via cross member 40. Cross member 40 includes a threaded bore 40A. Load bearing plate insert 30 includes a circular sidewall 30A and a threaded bore 30C positioned in alignment with threaded bore 40A. Threaded bores 30C and 40A accept threaded mounting fastener 70 for securement of devices to plate insert 30. Plate Insert 30 further includes connection means for securing plate insert 30 into opening 25B. In the preferred embodiment, the connection means are resiliently flexible tabs 30B having a lip 30B1 that engages outer periphery 25E locking plate insert 30 in place. When locked in place plate insert 30 circular sidewall 30A slideably engages sidewall 25D, allowing for plate 30 to be rotated to a limited degree up until lip 30B1 contacts mounting bosses 25G. Plate insert 30 further includes an opening 30D for the passage of cables from an interior wall to a mounted device.

Figure 2:
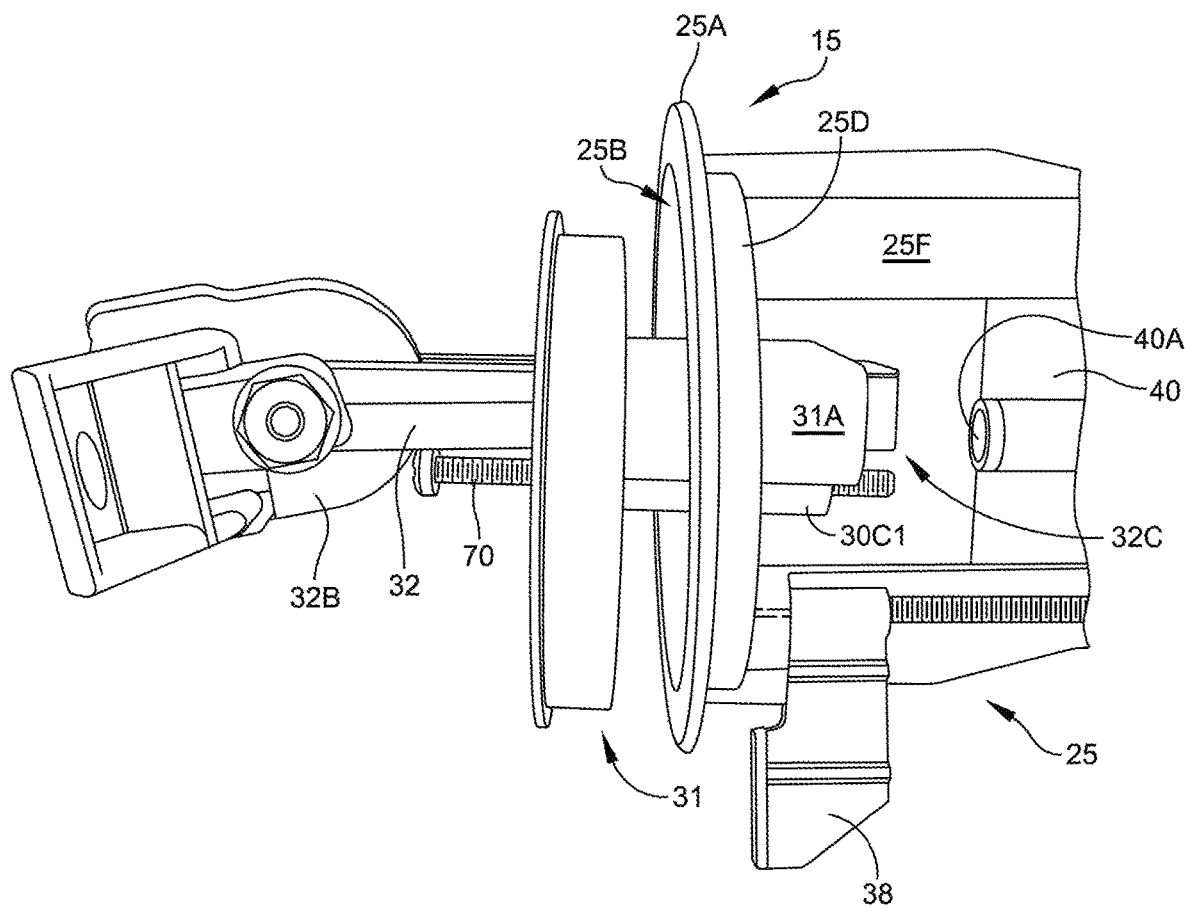
FIG. 2 illustrates a revised plate 31 including new components that integrate with the prior art wall anchoring system to provide the new capability of mounting and angularly positioning speakers and the like on a wall.

Referring to FIG. 2, an adjustable mounting apparatus 15 is disclosed for securing devices to a wall, such as speakers and the like. The apparatus 15 includes the same rigid frame 25 as disclosed in FIG. 1 but incorporates a new mounting plate assembly 31.

The adjustable mounting apparatus 15 includes a rigid frame 25 with a lip 25A having an opening 25B therein, a rearward extending sidewall 25D surrounding the opening, rearwardly extending guide members 25F extending rearward from said sidewall 25D and terminating at their ends into a cross-member 40, and a rigid mounting plate 31 within the opening 25B. The rigid mounting plate 31 is snap fit into the opening 25B and includes a center positioned threaded bore 30C1 for engagement by mounting fastener 70. The mounting plate 31, when removed, allows for angular adjustability of the load arm 32 to position a device attached to first end 32B to a desired angular orientation (See FIG. 5).

Figure 3:
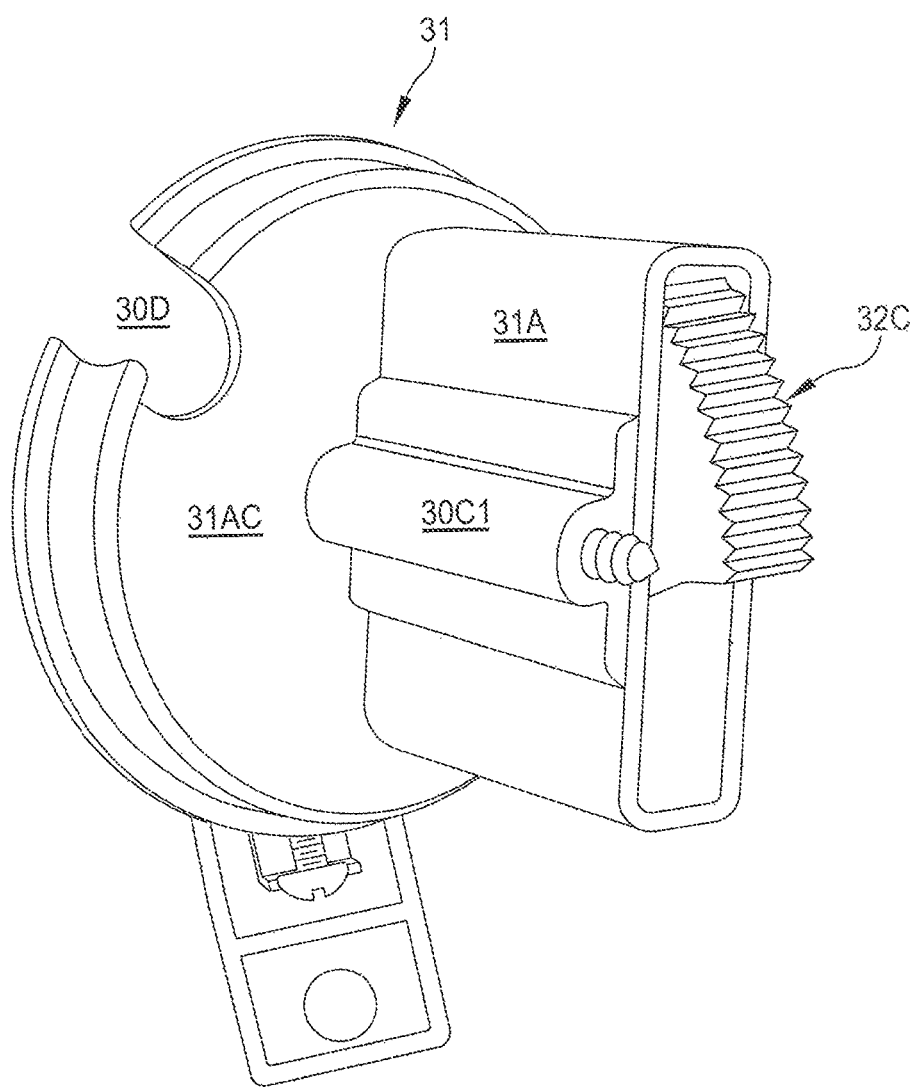
FIG. 3 is a rear perspective view of the plate 31 of FIG. 2.
Figure 4:
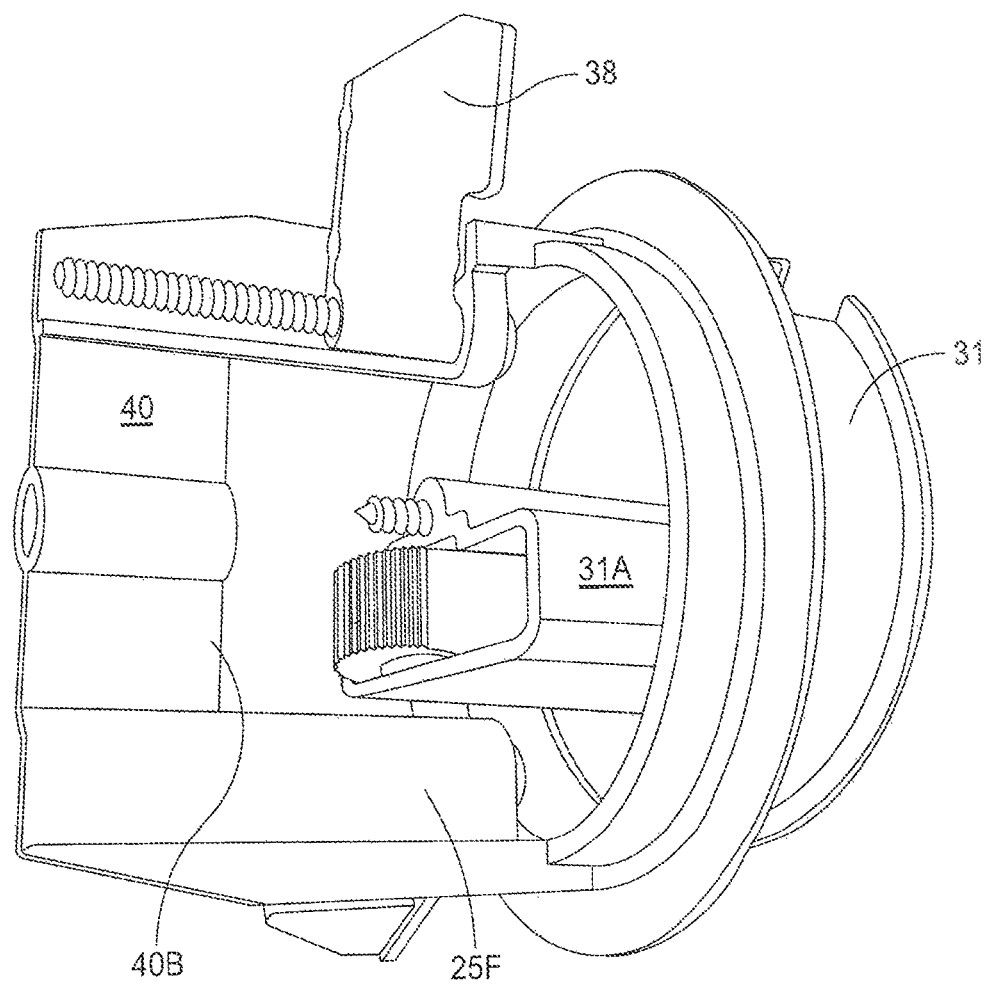
FIG. 4 is a perspective side view of FIG. 2.
Figure 5:
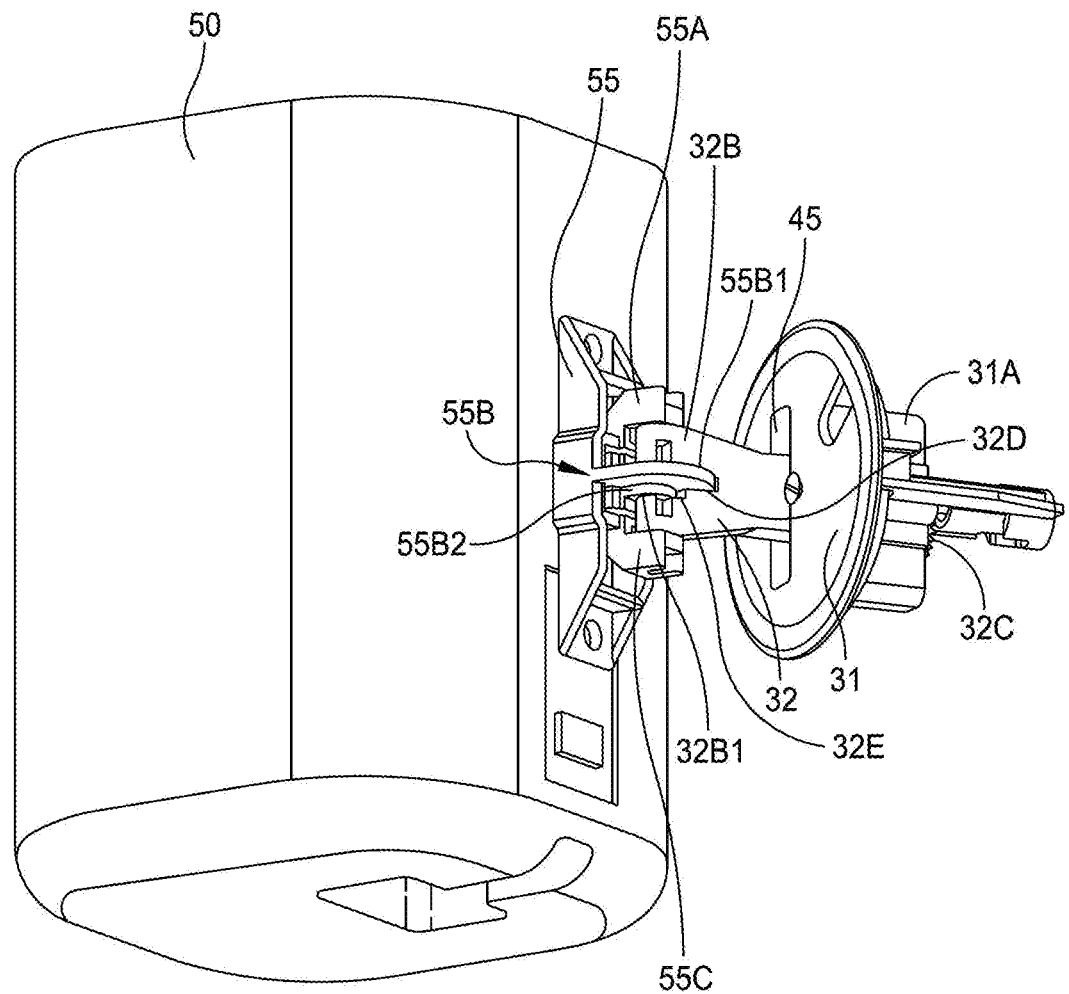
FIG. 5 illustrates the adjustable mounting apparatus of the present invention with a speaker 50 attached thereto.
Figure 10:
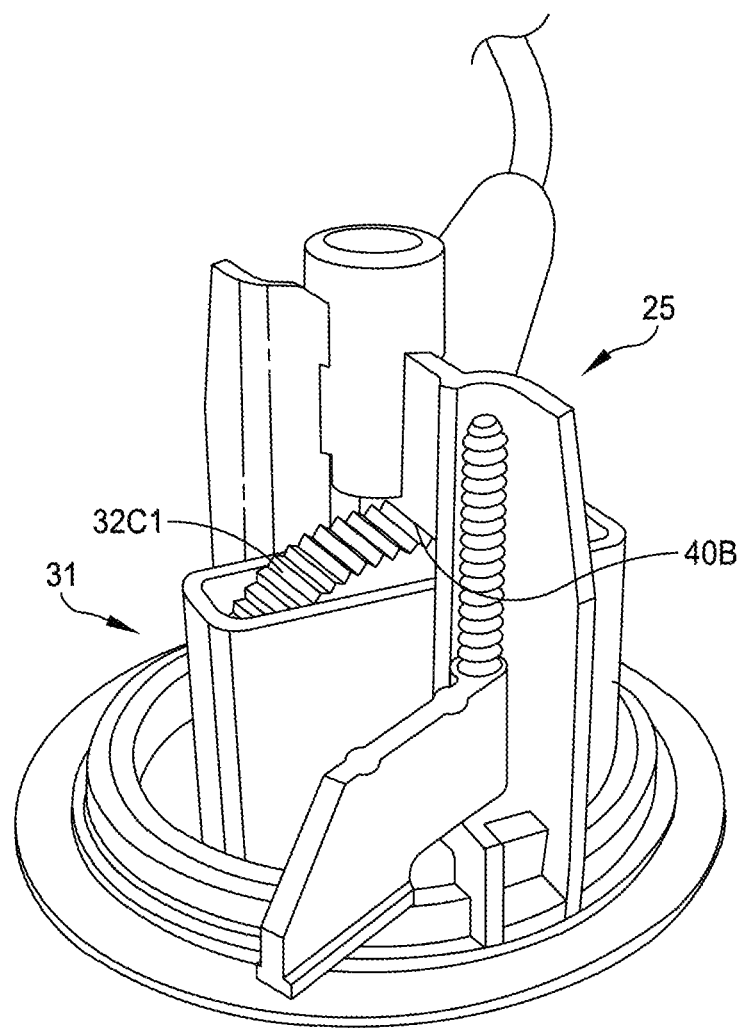
FIG. 10 illustrates plate 31 stepped grooves 32C1 engaged with cross-member end 40A of mounting frame 25.
Figure 11:
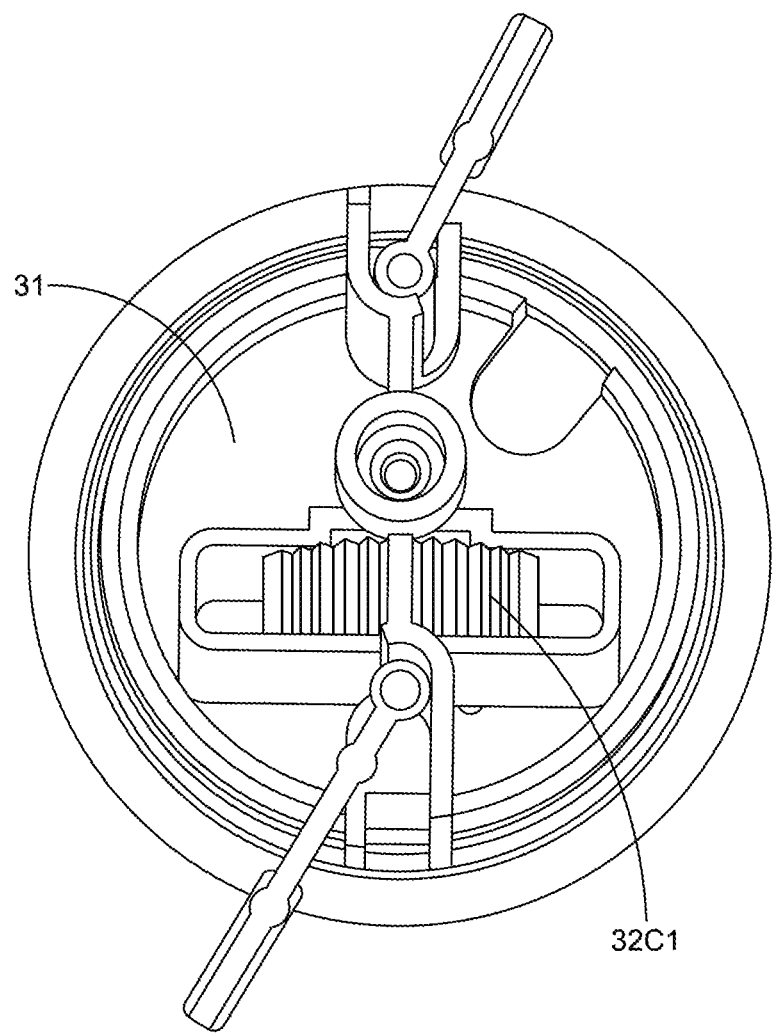
FIG. 11 is a rear view of FIG. 10.
Figure 12:
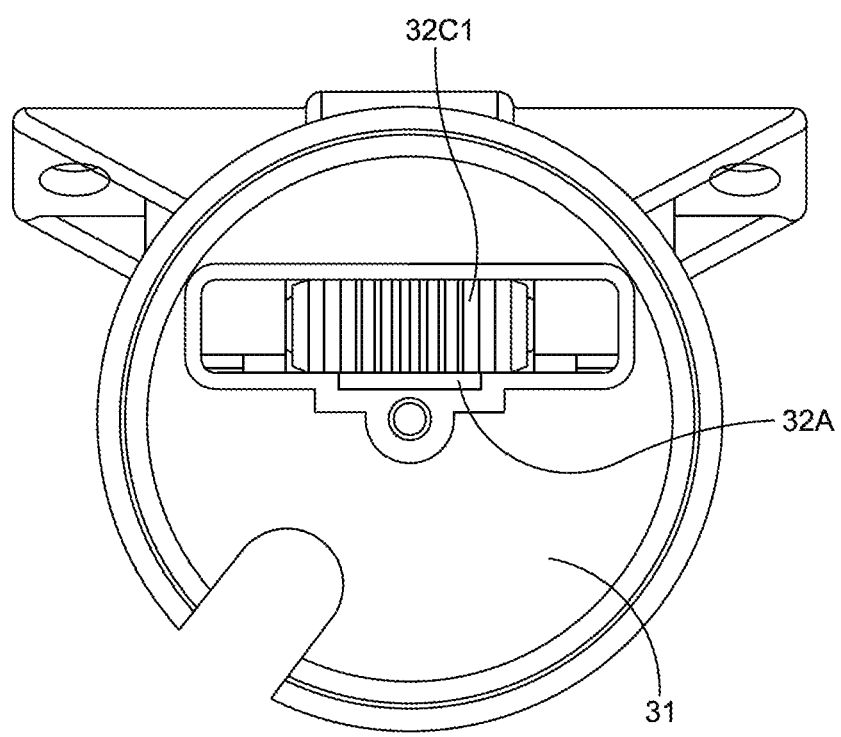
FIG. 12 illustrates the internal components of the plate 31.
Figure 14:
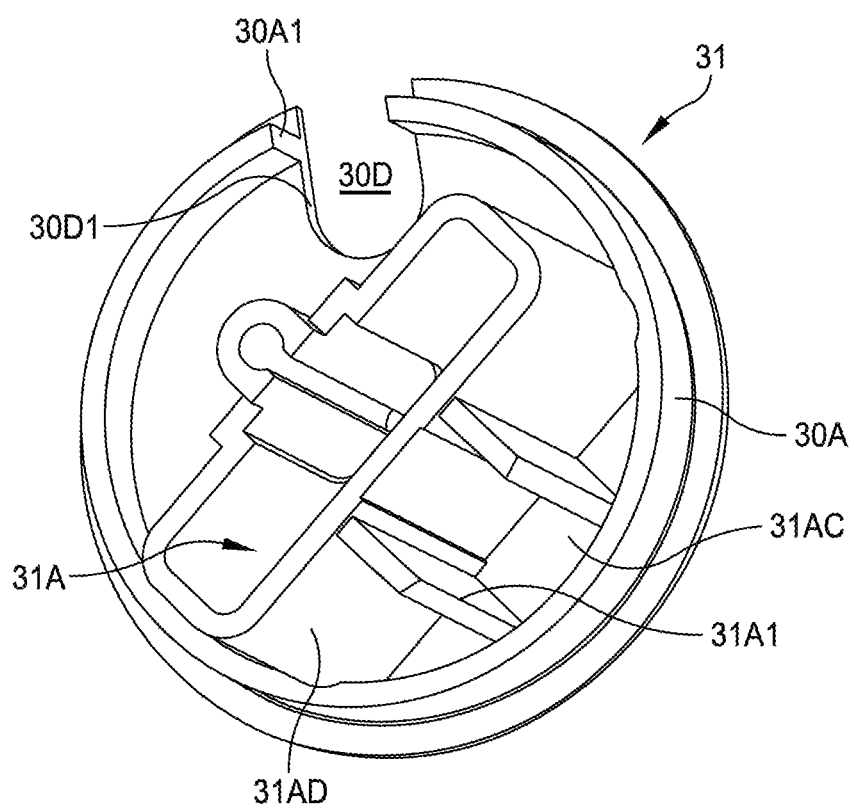
Figure 15:
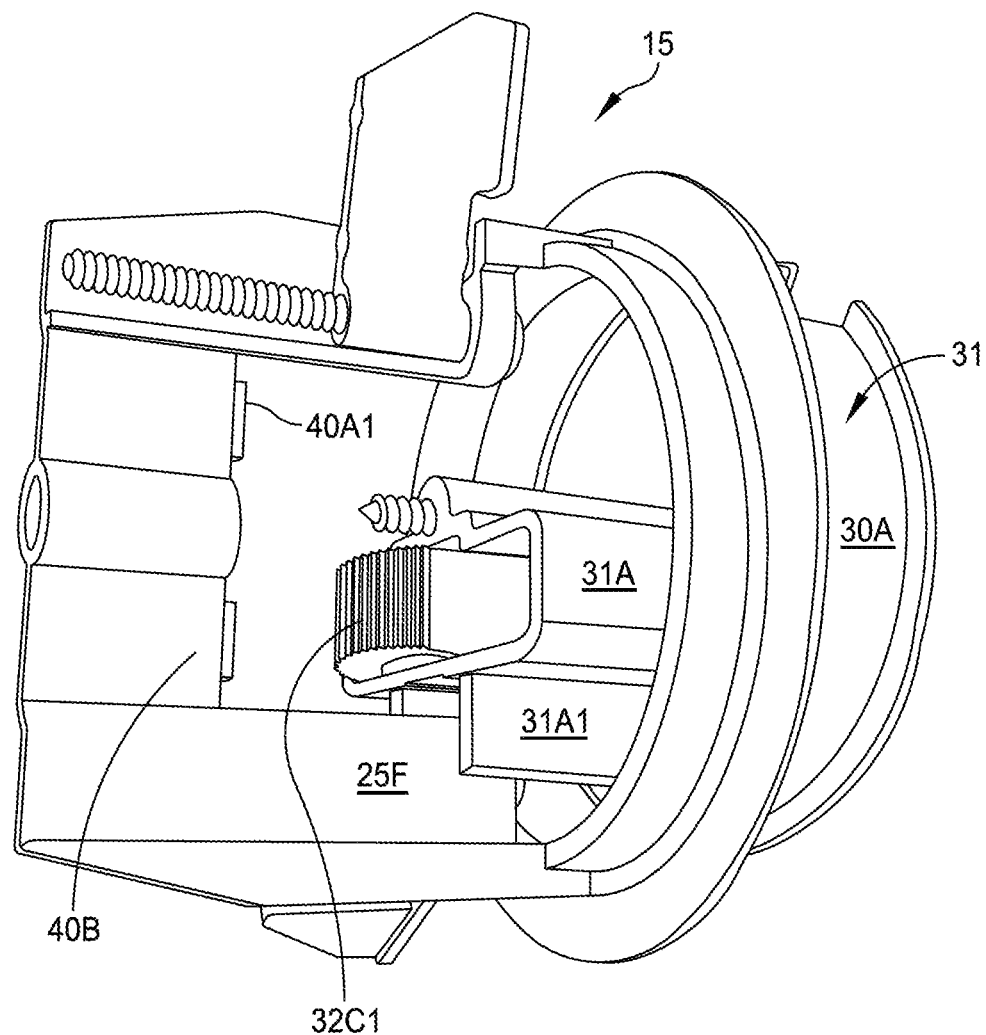
FIG. 15 is an alternate embodiment of FIG. 4 including detents 40A1 and bracing 31A1.
Figure 16:
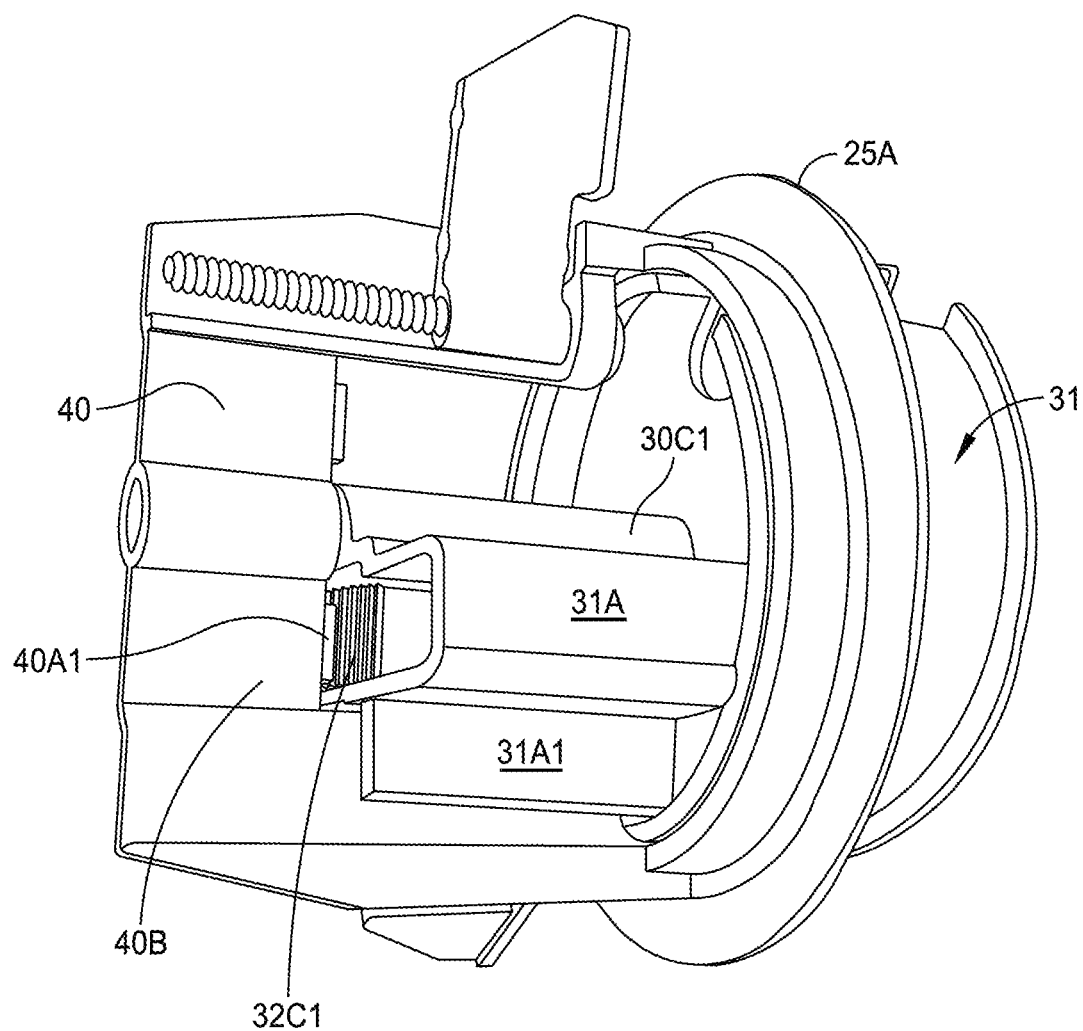
FIG. 16 illustrates FIG. 15 with plate 31 fully engaged.
Figure 17:
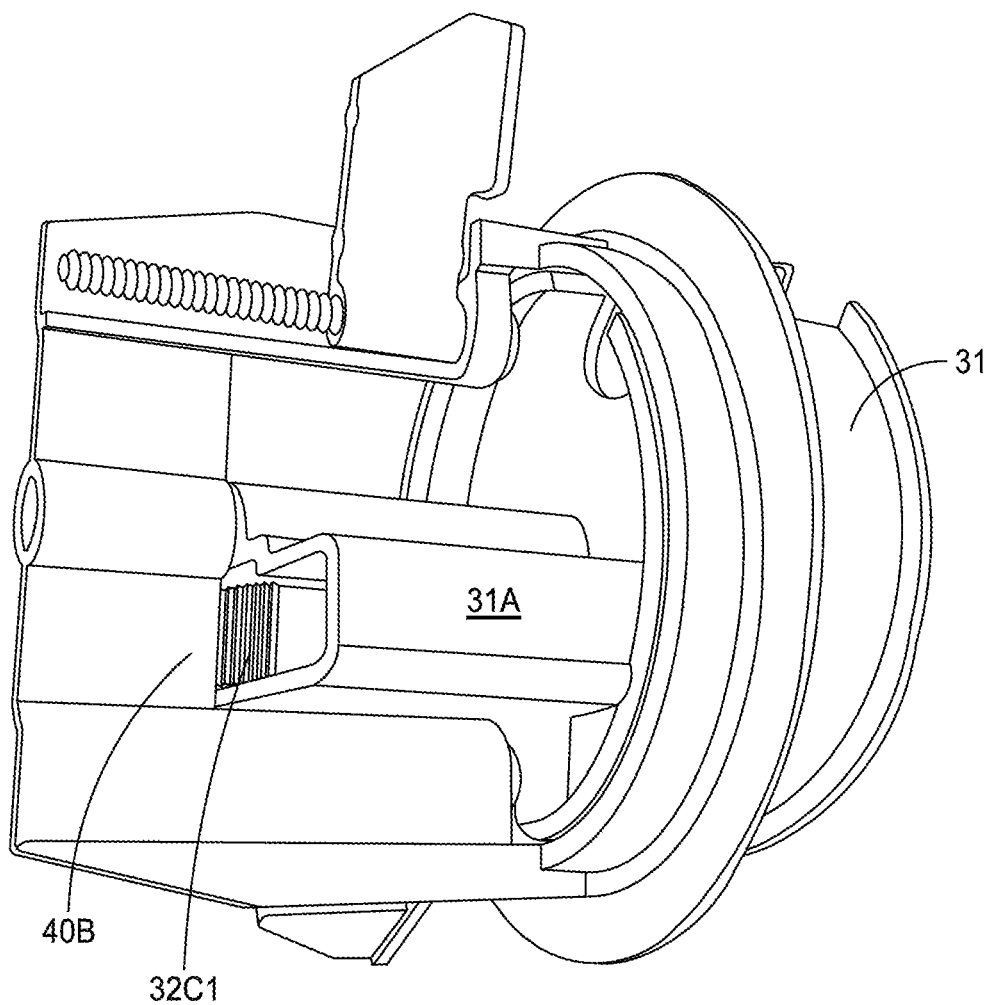
FIG. 17 illustrates FIG. 4 with plate 31 fully engaged.
Figure 18:
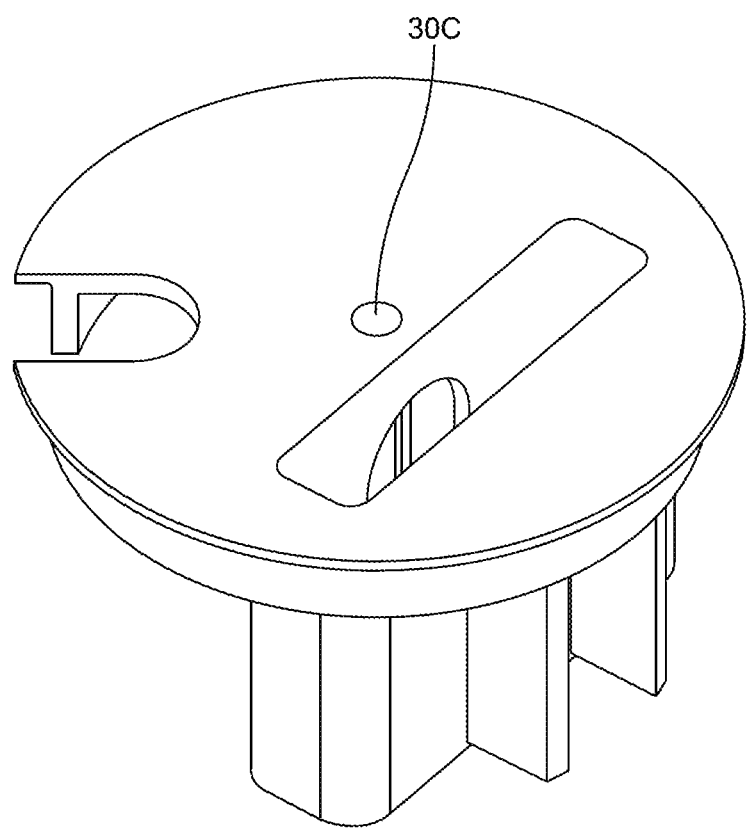
FIG. 18 is a front perspective view of FIG. 14.
Figure 19:
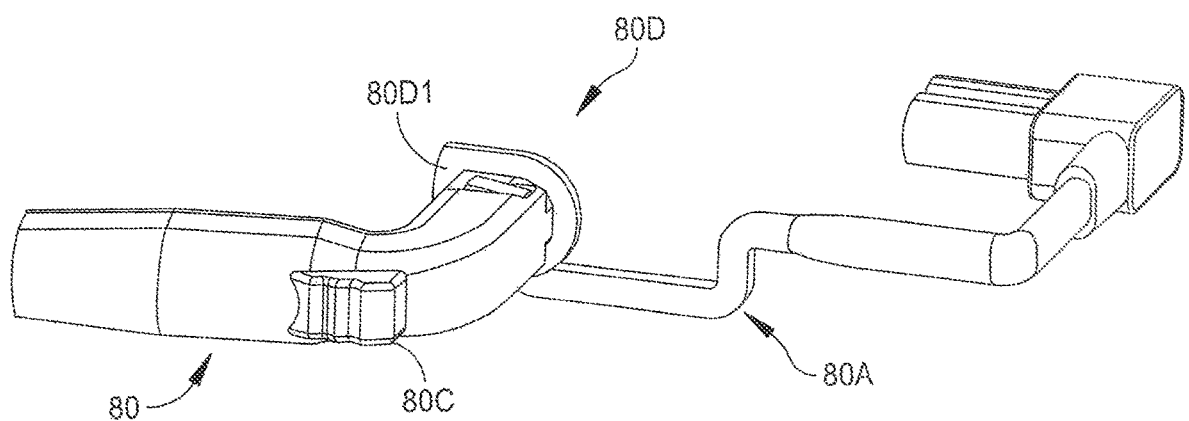
FIG. 19 illustrates a connector assembly 80 utilized in the present invention.
Figure 20:
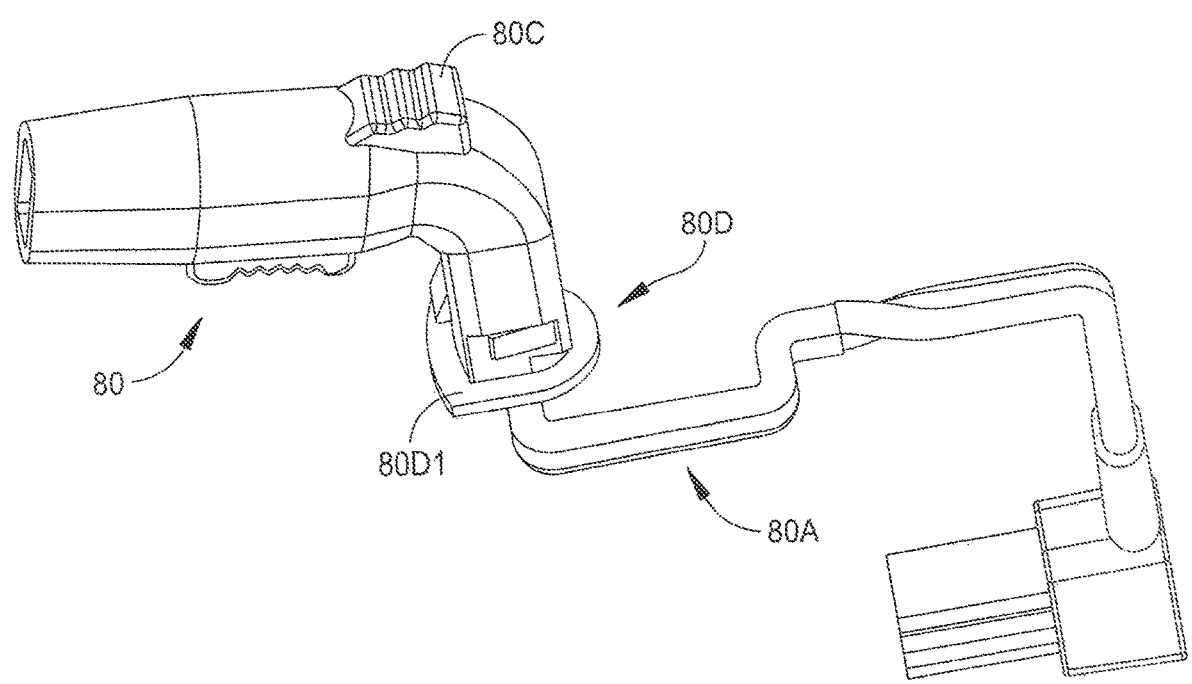
FIG. 20 is an alternate view of FIG. 19.
Figure 21:
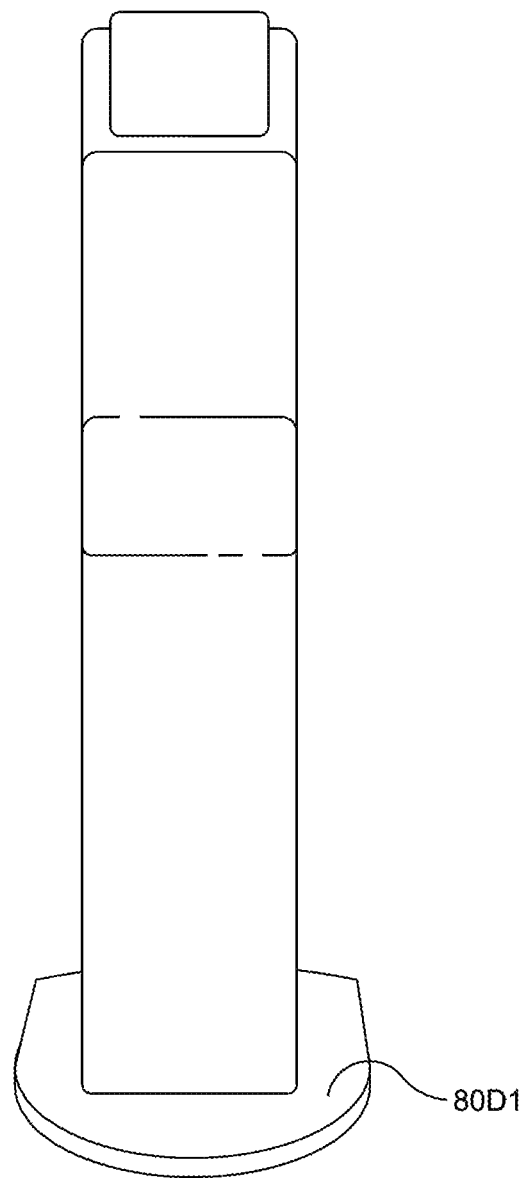
FIG. 21 is an expanded view of element 80D1 of FIG. 20.

Referring to FIGS. 2,3,4 and 5, the mounting plate 31 includes a guide channel 31A accessible through the front of the mounting plate 31 through slot 45, where slot 45 extends rearward terminating in close proximity to the cross-member 40 when mounting plate 31 is snap fit into opening 25B (See FIG. 10). Referring to. FIG. 14, Guide Channel 31A may include structural bracing 31A1 to add to the rigidity of mounting apparatus 15. The bracing 31A1 is fixedly attached to guide channel 31A outer surface 31AD and to mounting plate 31 bottom surface 31AC. Bracing elements 31A1 are spaced such that guide member 25F fits therebetween when mounting plate 31 is snap fit into opening 25B (FIG. 16). Referring to FIG. 3. The guide channel 31A, in the preferred embodiment, is integral to the mounting plate 31 and includes an integrated longitudinal bore 30C1 in substantial alignment with the center positioned threaded bore 30C of the mounting plate 31 (See FIG. 18). Referring to FIG. 5 a load arm 32 extends through the guide channel 31A, the load arm 32 having a first end 32B that connects to an external load 50 (ie. Speaker) positioned forward of the front of the mounting plate 31. Load arm 32 is generally rectangular in shape and extends through the rectangular slot 45 of guide channel 31A.

The load arm 32 first end 32B includes means for hingedly connecting a load such as a speaker 50, etc. The load 50 would include a fixed mounting point such as a mounting bracket 55 adaptable to engage the first end 32B of the load arm 32 to provide horizontal angular adjustability about the hinge point 32B1.

At the Hinge point 32B1 a mounting bracket 55 is slideably engaged within first end 32B of Load Arm 32. Mounting Bracket 55 includes a Top Extension Arm 55A, a Middle Extension Arm 55B, and Bottom Extension Arm 55C. Middle extension arm 55B is semi-circular and includes a first leg 55B1 and a second concentric leg 55B2. Middle Extension Arm 55B engages first end 32B up to a point where first leg 55B1 and second concentric leg 55B2 engage a stepped interior portion 32D and 32E (receiving end), respectively, of first end 32B. Top Extension Arm 55A, Middle Extension Arm 55B, and Bottom Extension Arm 55C after full engagement of first end 32B described above, will then allow for a hinge rod (not shown) to be passed through for secure coupling of the mounting bracket 55 and load arm 32. The design of extension arm 55C having concentric legs for engagement with a stepped receiving end provides added structural rigidity during movement about hinge point 32B1.

Figure 13:
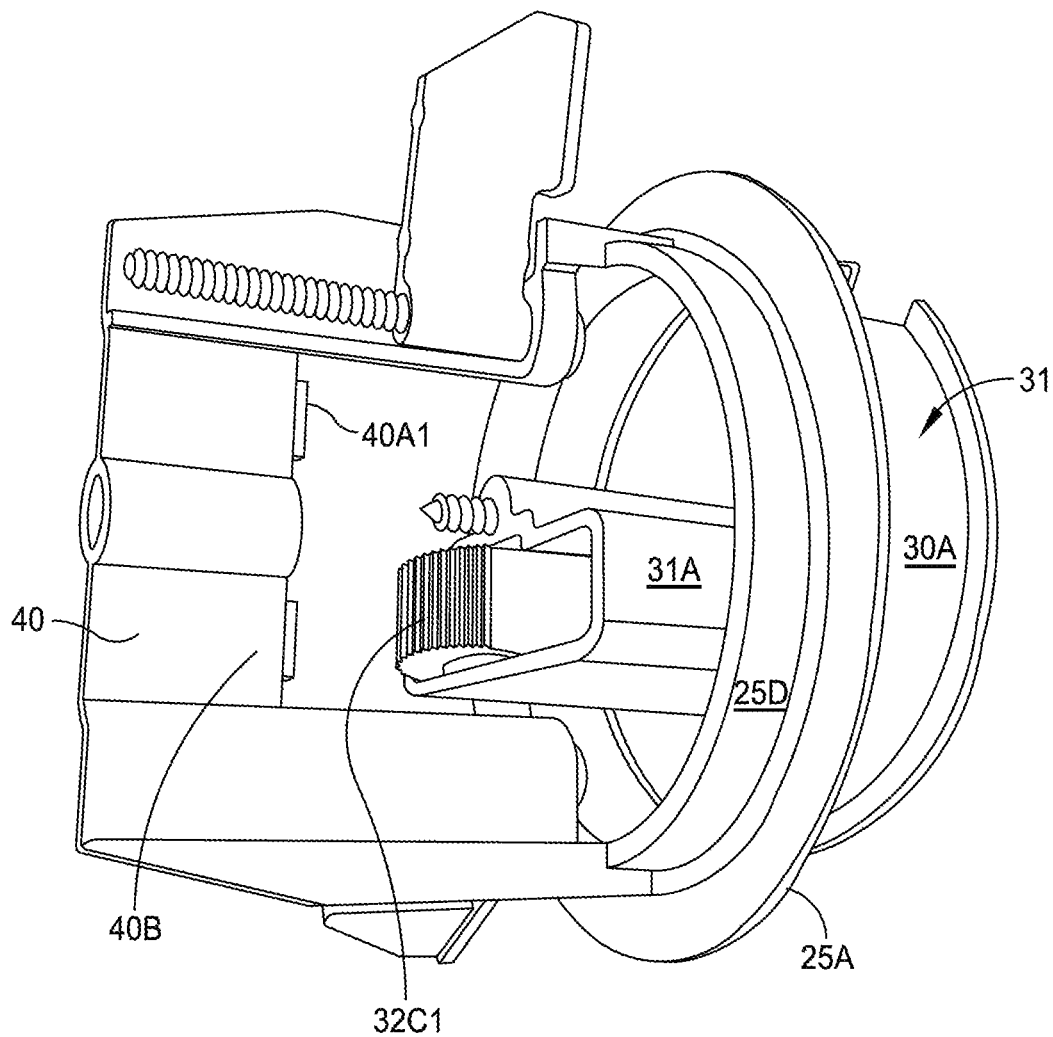
FIGS. 13 and 14 illustrate alternate embodiments of plate 31 and cross-member end 40A.

Referring to FIG. 2 and FIG. 3, the load arm 32 second end 32C is positioned rearward of the mounting plate 31, internal to the mounting apparatus 15 and includes a semi-circular end 32C having stepped grooves 32C1 to engage the cross-member 40 edge 40A at varying angular positions. Referring to FIG. 13, Edge 40A may include an additional detent 40A1 to facilitate increased engagement with grooves 32C1. When the mounting plate 31 is removed from its fixed position (FIGS. 2,4) of the opening 25B the load arm 32 is adjustable within the guide channel 31A for positioning the first end 32B of the load arm at different angles within guide channel 31A. These different angles correspond to varying vertical positions of the attached load 50 (ie speaker).

Figure 6:
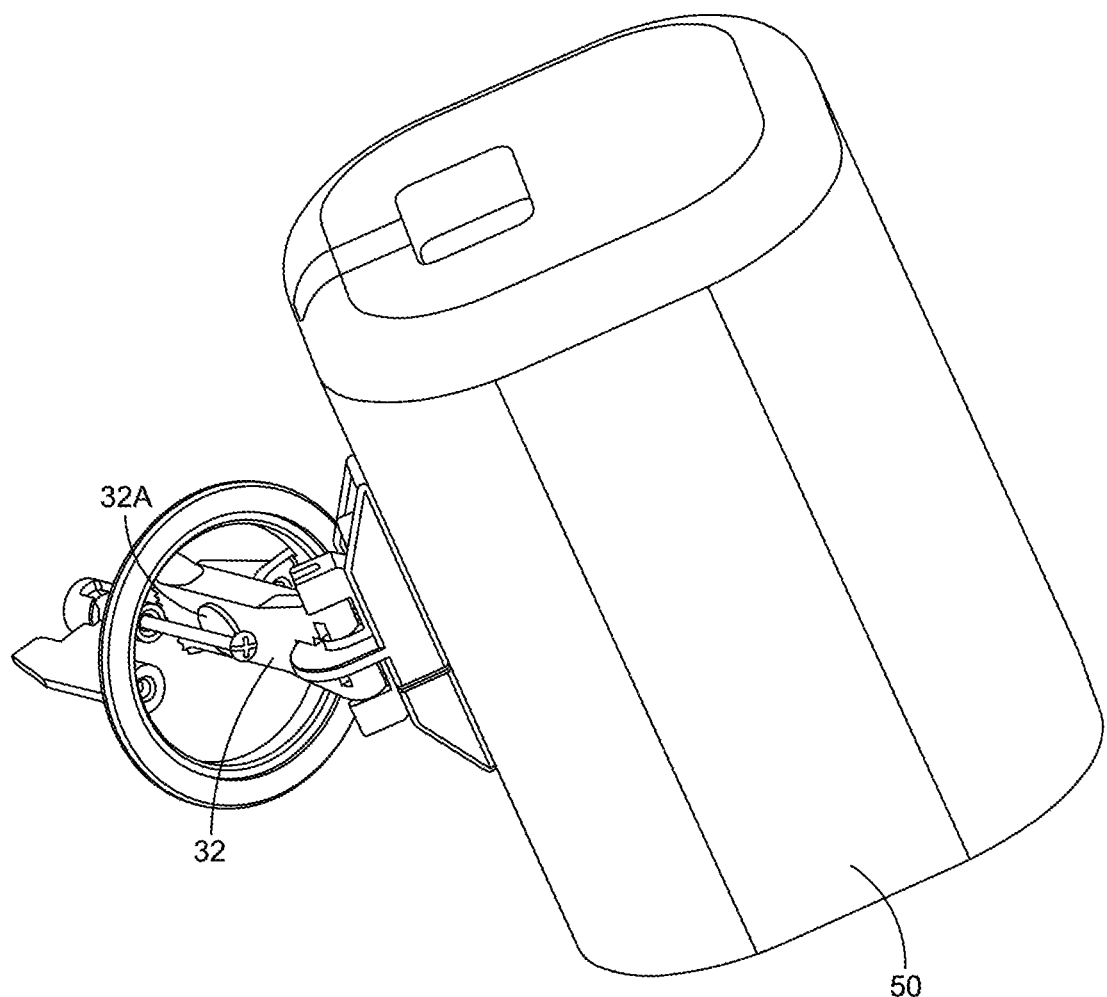
FIG. 6 is an alternate view of FIG. 5 illustrating the internal components of the adjustable mounting apparatus.
Figure 7:
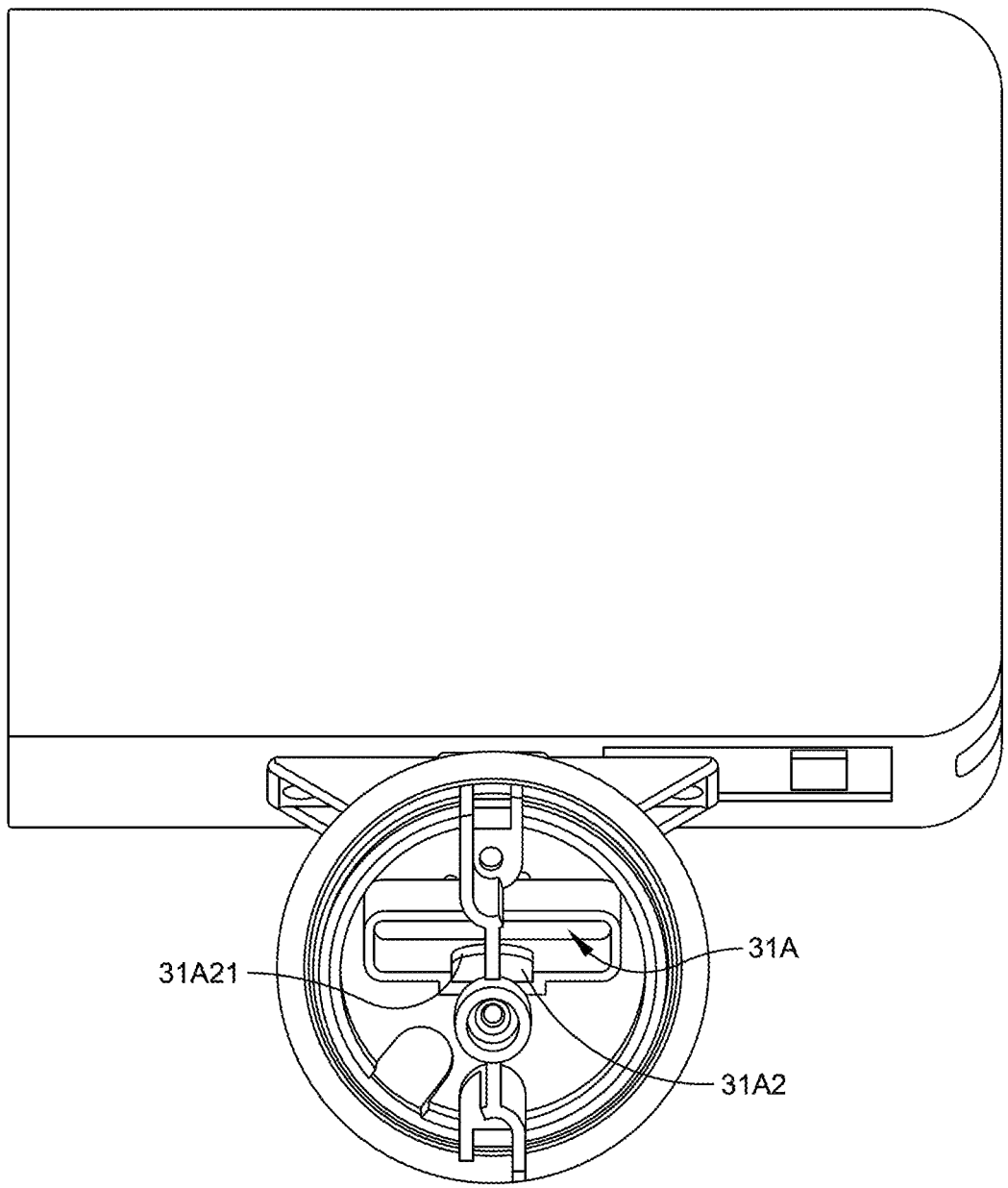
FIG. 7 is another alternate view of FIG. 5 illustrating the internal components of the adjustable mounting apparatus.
Figure 8:
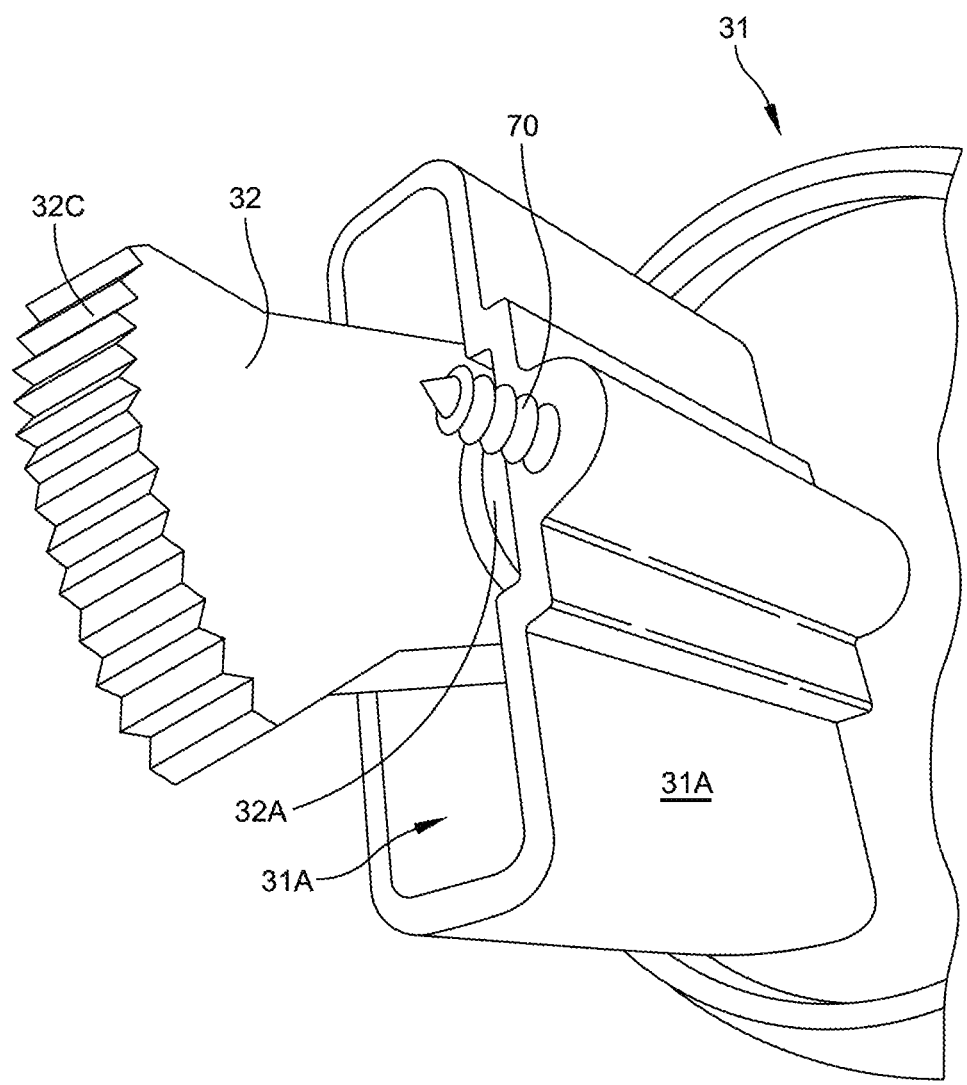
FIG. 8 is an alternate rear perspective view of view of the plate 31 of FIG. 2.

Referring to FIGS. 6-8, the load arm 32 is adjustable about a pivot point positioned within the guide channel 31A, the pivot point including means to retain the load arm 32 midsection within the channel 31A at a fixed position determined by the load arms 32 second end 32C engaged position with the cross-member 40. The load arm 32 pivot means includes a semi-circular protuberance 32A positioned on the load arm 32 that engages a semi-circular recess 31A2 positioned in the guide channel 31A. The load arm 32 is pushed through the guide channel 31A up to a point where the semi-circular protuberance 32A "falls in" to the semi-circular recess 31A2 fixing the midsection of the load arm 32 about this pivot point within the guide channel 31A, and restricting the load arm 32 from being pulled out of the channel 31A where the semi-circular recess 31A2 peripheral edge walls 31A21 engage the protuberance 32A.

Referring to FIGS. 2, 6, 7, and 10, at the point where the semi-circular protuberance 32A "falls in" to the semi-circular recess 31A2, and when the mounting plate 31 is snap fit into opening 25B the semi-circular end 32C stepped grooves will engaged at a particular angular position the cross-member 40 edge 40A. At this point the load arm 32 is precluded from pivoting in the channel (FIG. 10). Referring to FIGS. 2, 16, and 18a set screw 70 engages the mounting plate bore 30C, the longitudinal bore 30C1 of the guide channel 31A, and the treaded bore 40A of the cross-member 40. By tightening the set screw 70 the cross-member 40 edge 40A is forced into the semi-circular end 32C stepped grooves 32C1; the semi-circular protuberance 32A positioned on the load arm 32 engages with force the semi-circular recess 31A2 positioned in the guide channel 31A (FIGS. 6,7), and the mounting plate 31 is secured within the mounting apparatus 15 opening 25B (FIG. 16). This allows for a stable mounting apparatus 15 with the load of the attached device 50 to be distributed throughout the mounting apparatus 15.

Figure 9:
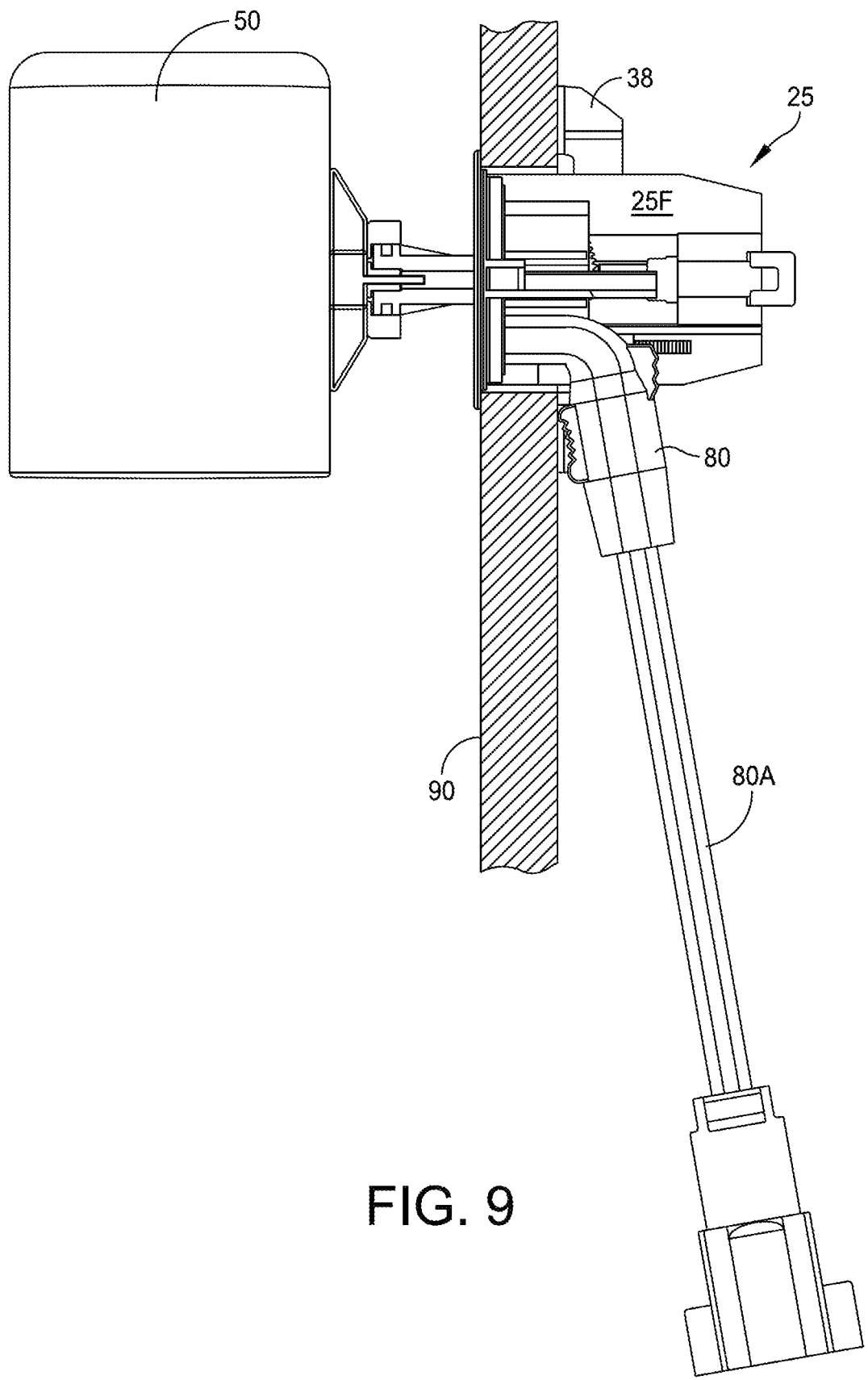
FIG. 9 illustrates the adjustable mounting apparatus of the present invention as secured to a wall structure and including a power feed assembly.
Figure 22:
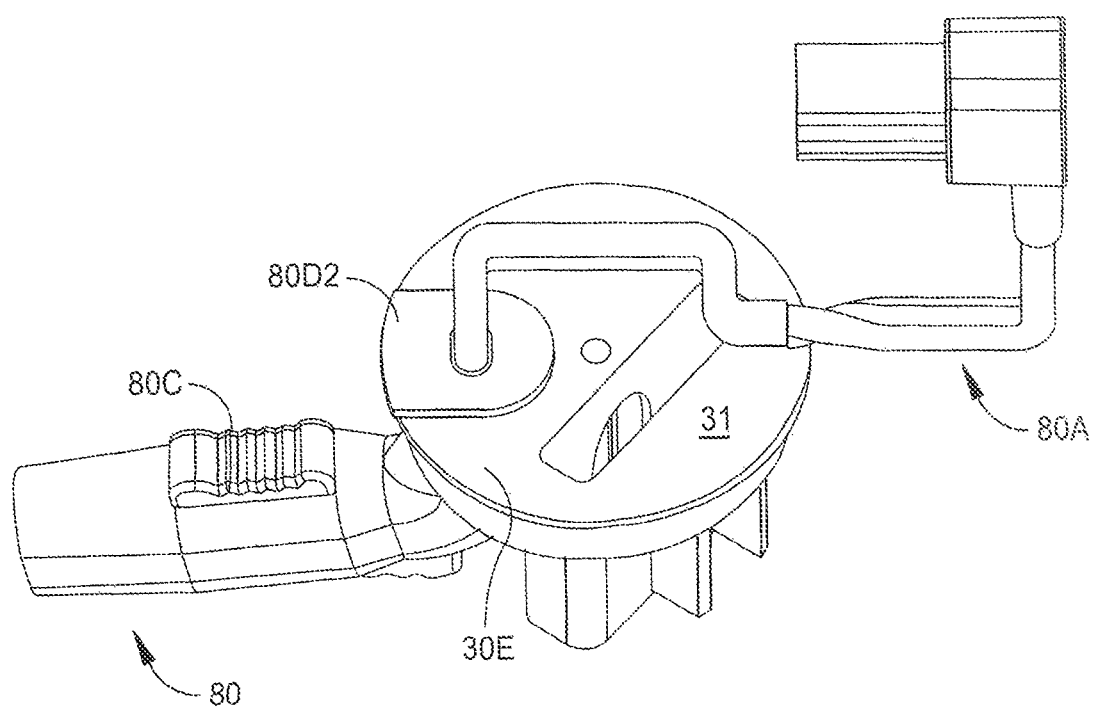
FIG. 22 illustrates connector assembly 80 mated to plate 31.
Figure 23:
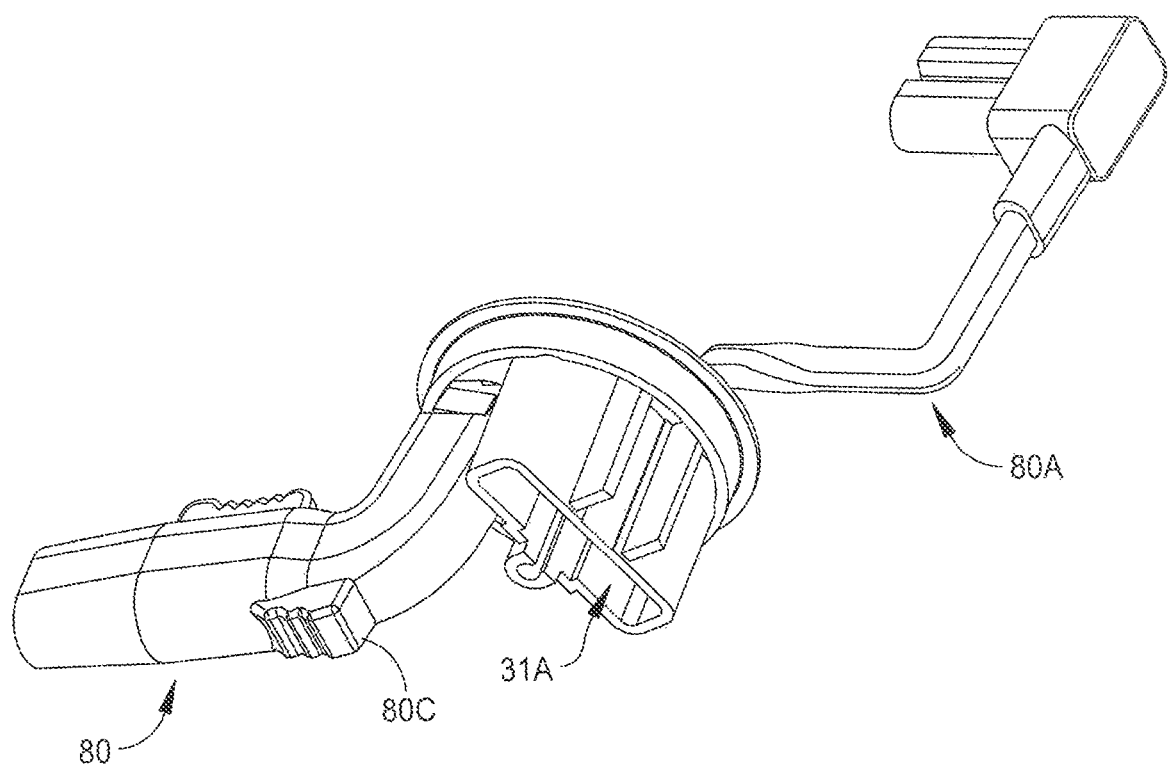
FIG. 23 is a rear perspective view of FIG. 22.

All that is required for preparing the wall for installation of the mounting apparatus is a simple circular hole, which can be rapidly made in the sheet rock by a simple hole saw. To secure the rigid frame to the wall 90, the mounting fasteners with attached clamp arms 38 on the frame 25, and the guide members 25F are passed through a hole in the wall 90 and the clamp arms 38 are rotated to force the clamp arms against the interior 90A of wall 90 (See FIG. 9). As illustrated in FIG. 22, a connector assembly 80 may be integrated into mounting plate 31 and mounting apparatus 15 (FIG. 9). Connector assembly 80 provides power to a mounted device, such as a wall mounted speaker 50. Connector assembly 80 receives power from, a source via power input cable 80A as illustrated in FIG. 9.

Figure 24:
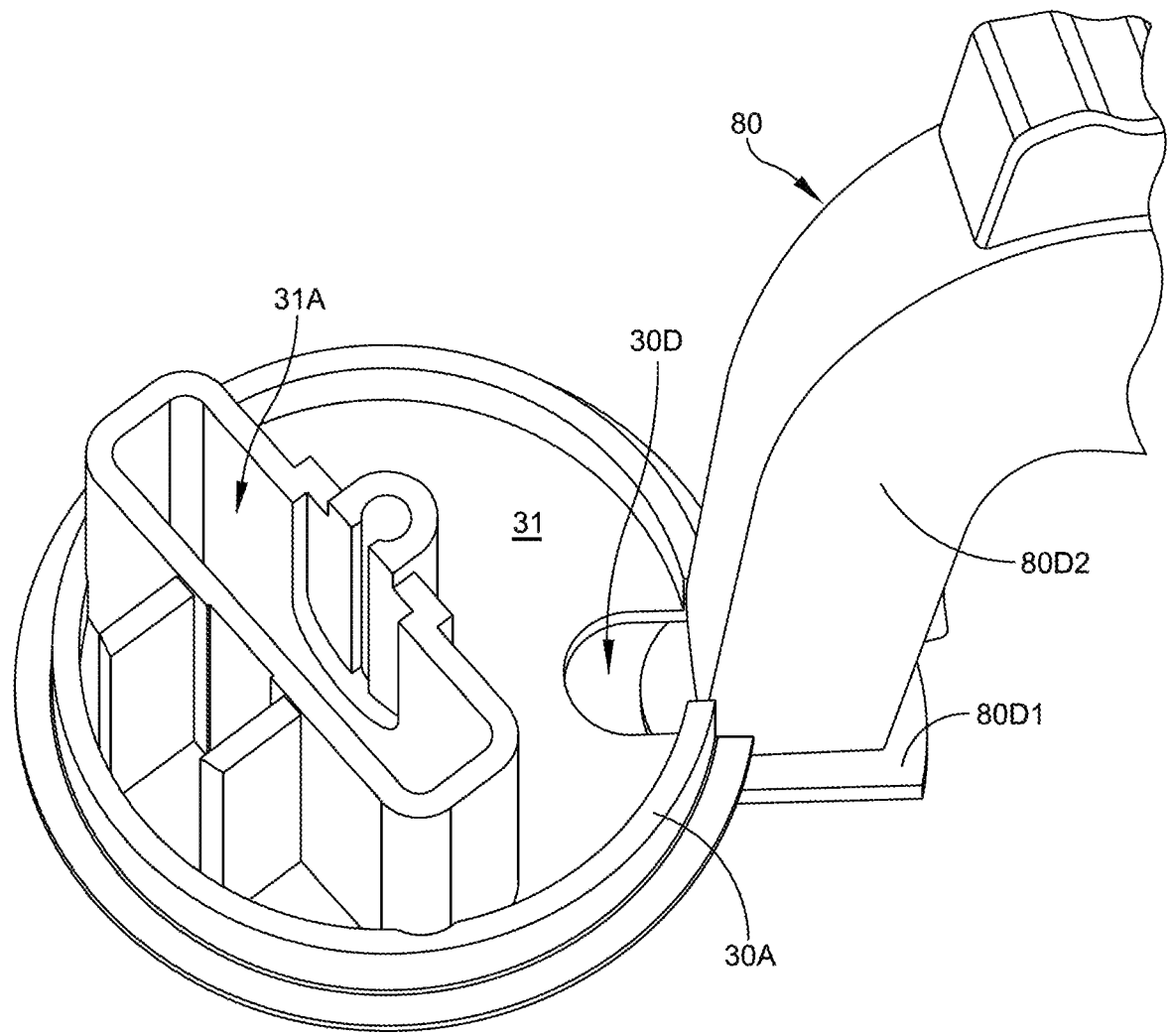
FIG. 24 illustrates connector assembly 80 engaging plate 31.

Referring, to FIG. 14, plate 31 includes an opening 30D having peripheral edges 30D1 and 30A1. Referring to FIGS. 19 through 22, connector assembly 80 includes at one end a generally L shaped connector that is preferably overmolded. The connector includes gripping means 80C to facilitate mounting of the connector 80 to plate 31. Connector 80 includes an end lip 80D having a top surface 80D1 and a bottom surface 80D2. Referring to FIG. 14 and FIG. 24, the width of connector 80 will allow connector 80 surfaces 80D2, which are perpendicular to top surface 80D1, to have a tight fit into opening 30D while slideably engaging plate 31 peripheral edges 30D1 and 30A1.

Figure 25:
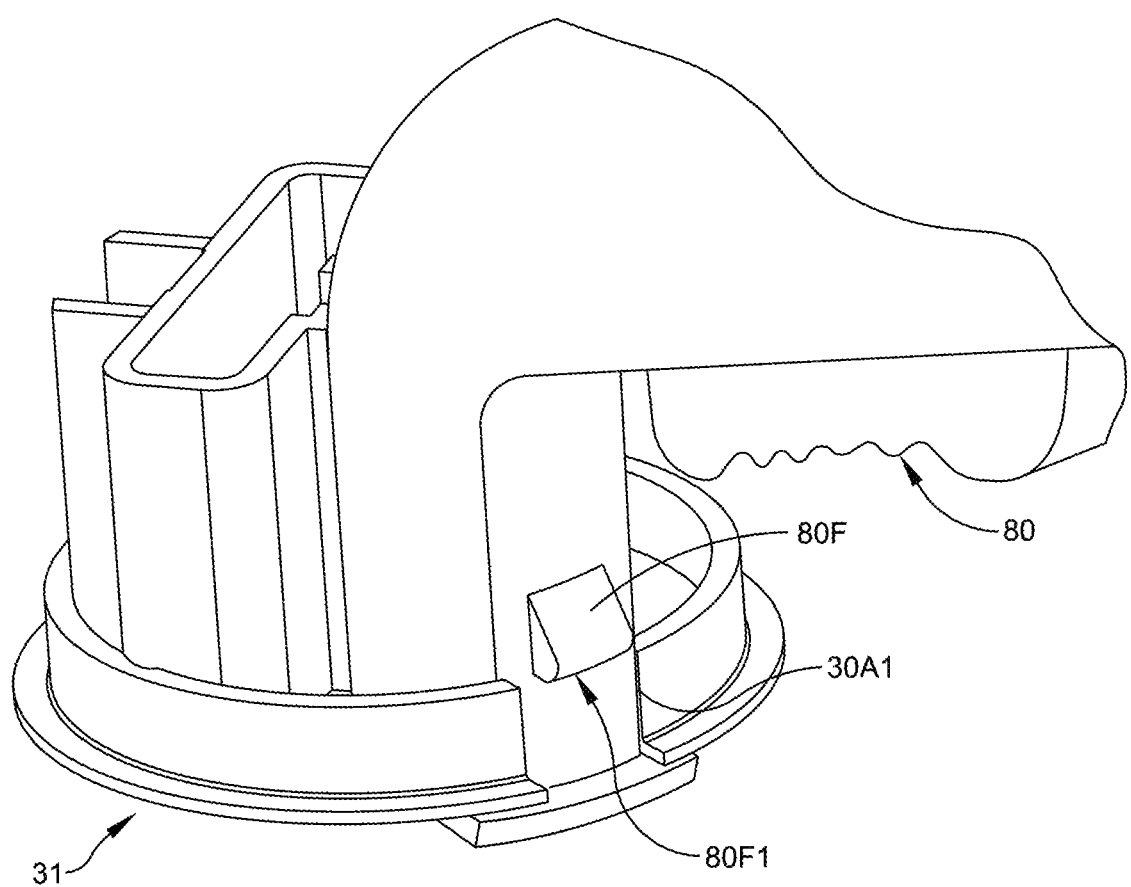
FIG. 25 illustrates connector assembly 80 fully engaged into plate 31.
Figure 26:
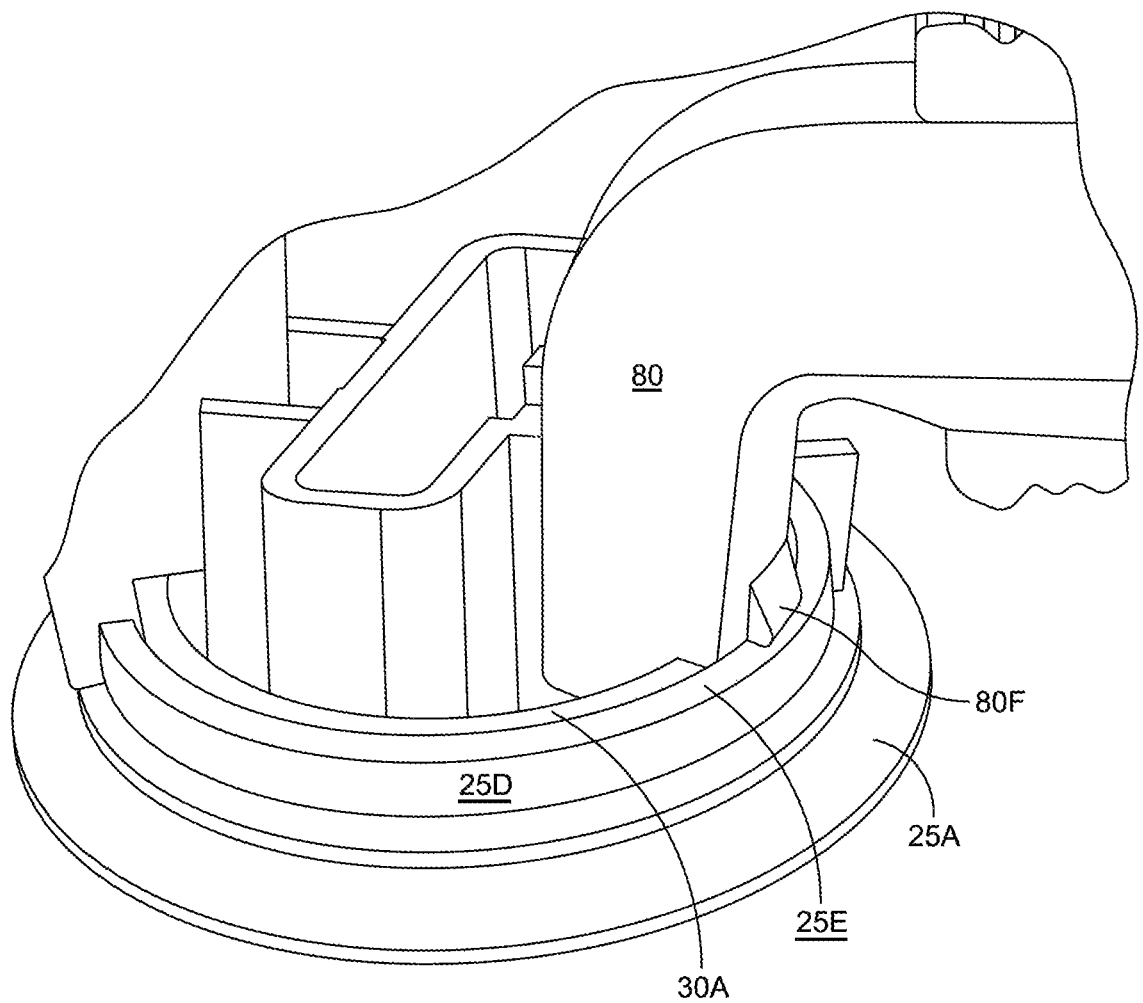
FIG. 26 illustrates connector assembly 80 fully engaged into plate 31 then fully engaged into rigid frame 25.

As illustrated in FIG. 24 and FIG. 26, top surface 80D1 engages opening 30D up to a point of full engagement (FIG. 25). Connector 80 further includes a protuberance 80F with bottom surface 80F1. Gripping means 80C facilitates the tight placement of connector 80 inserted into opening 30D. Plate insert 31 is fit within plate opening 25B as illustrated in 26. Protuberance 80F bottom surface 80F1 engages outer periphery 25E of rigid frame 25 securing connector 80 therein.

The combination, of clamp arms 38, load bearing plate 31, and cross member 40 allow for the mounting of devices of significant weight. The mounting apparatus 15 may be molded of various plastics including polycarbonate, polyvinyl chloride, acrylonitrilebutadience styrene, and polyethylene, as well as others known in the art for the intended application of supporting a load.

It should be understood that the foregoing description is only illustrative of the invention. Thus, various alternatives and modifications can be devised by those skilled in the art without departing from the invention. Accordingly, the present invention is intended to embrace all such alternatives, modifications and variances that fall within the scope of the appended claims.

I claim:

1. An adjustable mounting apparatus for securing devices to a wall, comprising:
   a rigid frame, comprising
   at one end a lip extension, said lip extension having a front surface and a rear surface, said rear surface having an opening therein and a sidewall extending rearward from said rear surface;
   at least one guide member extending rearward from said rearward extending sidewall to the opposite end of said rigid frame, said guide member further including a cross member, said cross member including a middle portion having a first threaded bore therein,
   a plate positioned between a first position and a second position within said opening of said lip extension, said first position wherein said plate is fixedly inserted within said lip extension opening and said second position wherein said plate is removed from said lip extension opening,
   said plate further including a second threaded bore therein, said first and second threaded bores in substantial alignment, said plate insert further including a guide channel extending from said plate top surface rearward towards said cross member,
   a load arm having a body portion extending between a first semicircular flared end and a second end, said load arm partially engaged within said guide channel and movable about a pivot point within said channel when said plate is in said second position, said semicircular flared end adjustable to discrete positions along said semicircle to vary the angular orientation of said second end, said second end fixed when said semicircular flared end engages said cross-member in said first position;
   a mounting arrangement for securing said rigid frame to a wall.

2. The adjustable mounting apparatus for securing devices to a wall as in claim 1 wherein said mounting arrangement is integrated within said guide members.

3. The adjustable mounting apparatus for securing devices to a wall as in claim 1 wherein said plate includes an opening for cable pass through.

4. The adjustable mounting apparatus for securing devices to a wall as in claim 1 wherein said plate includes means for securing said plate insert within said lip extension opening.

5. The adjustable mounting apparatus for securing devices to a wall as in claim 1 wherein at least two guide members include said cross-member therebetween.

6. The adjustable mounting apparatus for securing devices to a wall as in claim 1 wherein said mounting arrangement includes:
   a mounting boss integral with said rigid frame, said mounting boss recessed rearward from said lip extension; and an aperture in said mounting boss.

7. The adjustable mounting apparatus for securing devices to a wall as in claim 6 wherein said mounting arrangement further includes:
   a mounting fastener extending through said aperture in said mounting boss; and
   clamp arms in engagement with said mounting fasteners, said mounting fastener for rotation of said clamp arms between an extended and retracted position.

8. The adjustable mounting apparatus for securing devices to a wall as in claim 5 wherein said guide members are situated 180 degrees apart on opposite sides of said sidewall.

9. The adjustable mounting apparatus for securing devices to a wall as in claim 1 wherein said second threaded bore extends coextensively along said guide channel.

10. The adjustable mounting apparatus for securing devices to a wall as in claim 1 wherein said semicircular flared end includes a plurality of stepped grooves to engage said cross-member in said first position.

11. The adjustable mounting apparatus for securing devices to a wall as in claim 1 wherein said pivot point further includes a pivot means, said pivot means comprising:
    a protuberance positioned on said load arm portion located within said guide channel;
    a recess positioned within said guide channel;
    said protuberance engaged within said recess to secure said load arm within said channel and to fix said load arm midsection about said pivot point, said engagement with said recess allowing for angular adjustability of said load arm.

12. The adjustable mounting apparatus for securing devices to a wall as in claim 1 further including a Power Feed Through Connector Assembly, comprising:
    a handle,
       said handle comprising a middle grip portion extended between a first and second distal ends, said first distal end receiving a power source input,
       said second distal end of said handle including top, bottom, left and right side surfaces that terminate into an extended lip, said extended lip including a top and bottom surface;
       said second distal end further including a power feed extending outward from said second distal end, said second distal end of said handle in engagement with said plate.

13. The adjustable mounting apparatus for securing devices to a wall as in claim 12, wherein said plate further includes a front and rear surface and at least one opening therein, said second distal end of said handle engaged within said plate opening, said power source output exiting said front surface of said plate.

14. The adjustable mounting apparatus for securing devices to a wall as in claim 13, wherein at least one of said left and right side surfaces includes a locking tab.

15. The adjustable mounting apparatus for securing devices to a wall as in claim 14, wherein said locking tab slopes upward between a first and second end.

16. The adjustable mounting apparatus for securing devices to a wall as in claim 13, wherein said handle includes a gripping means.

17. The adjustable mounting apparatus for securing devices to a wall as in claim 13, wherein said middle portion is substantially L shaped to facilitate the manipulation of the connector assembly.

18. The adjustable mounting apparatus for securing devices to a wall as in claim 13, wherein said plate further includes a lip extension, said lip extension having a front surface and a rear surface, and a sidewall, said sidewall including a first end and a second end, said first end connected to the rear surface of said lip extension, the sidewall extending away from said lip extension rear surface to a second end.

19. The adjustable mounting apparatus for securing devices to a wall as in claim 18, wherein said at least one opening projects inward from the periphery of said plate into the interior of said plate, said opening including a peripheral edge bisecting said sidewall to create first and second sidewall edges, and bisecting said lip to create first and second lip edges.

20. The adjustable mounting apparatus for securing devices to a wall as in claim 19, wherein said left and right side surfaces of said second distal end of said handle slideably engaging said peripheral edge of said plate opening, and said extended lip top surface slideably engaging said rear surface of said mounting plate up to a point when said second distal end of said handle is fully inserted within said opening.

* * * * *